Aug. 18, 1970       M. L. MASTRACCI ET AL       3,524,558
CARGO LOADING MEANS AND METHOD
Filed March 29, 1968                    6 Sheets-Sheet 1
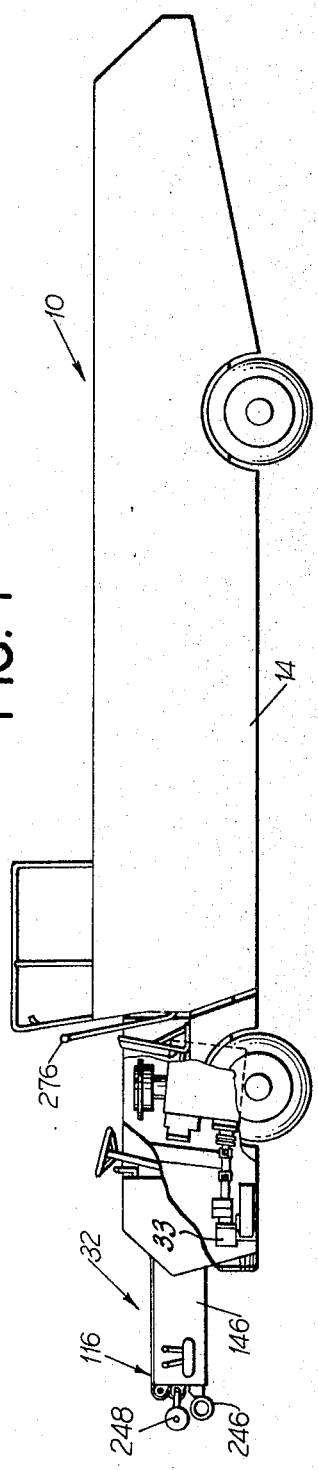
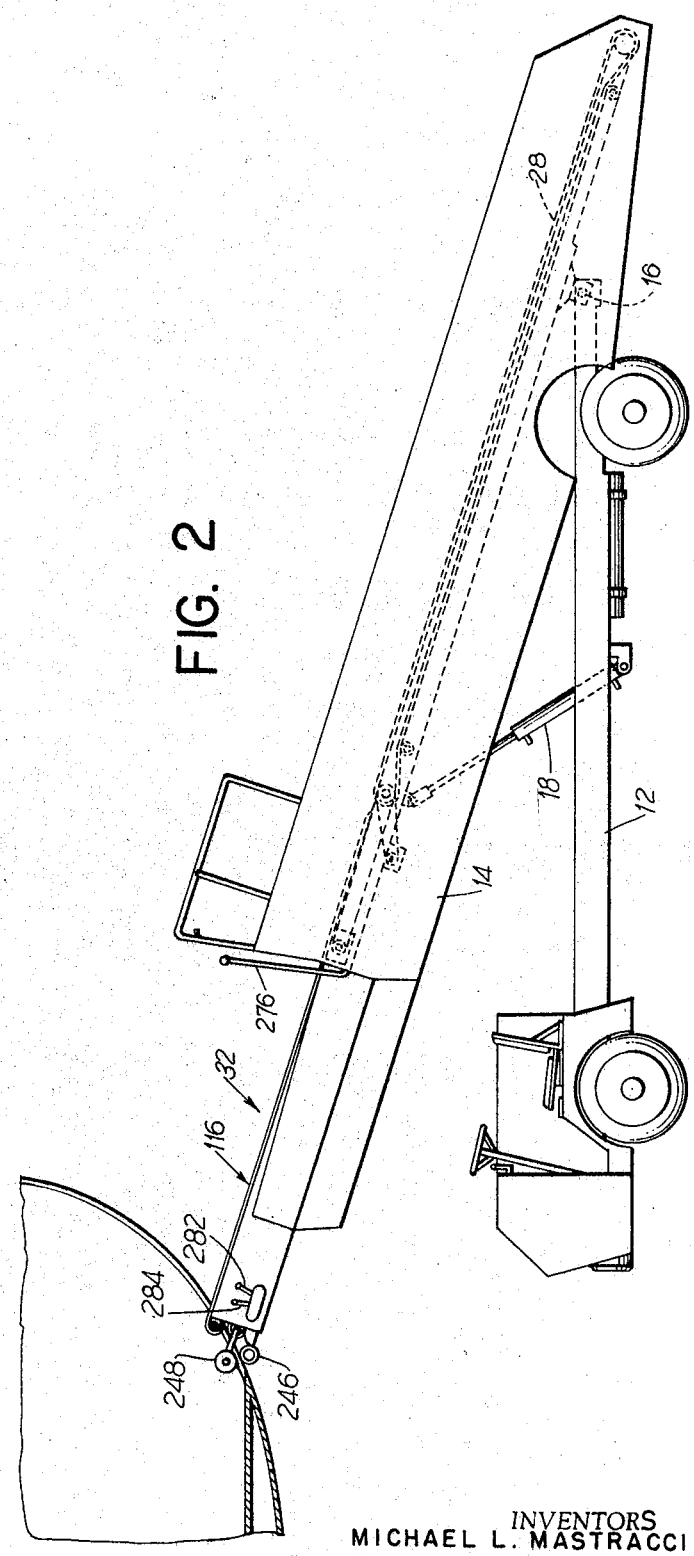
INVENTORS
MICHAEL L. MASTRACCI
JOHN H. LANGENHOP
BY
ATTORNEY

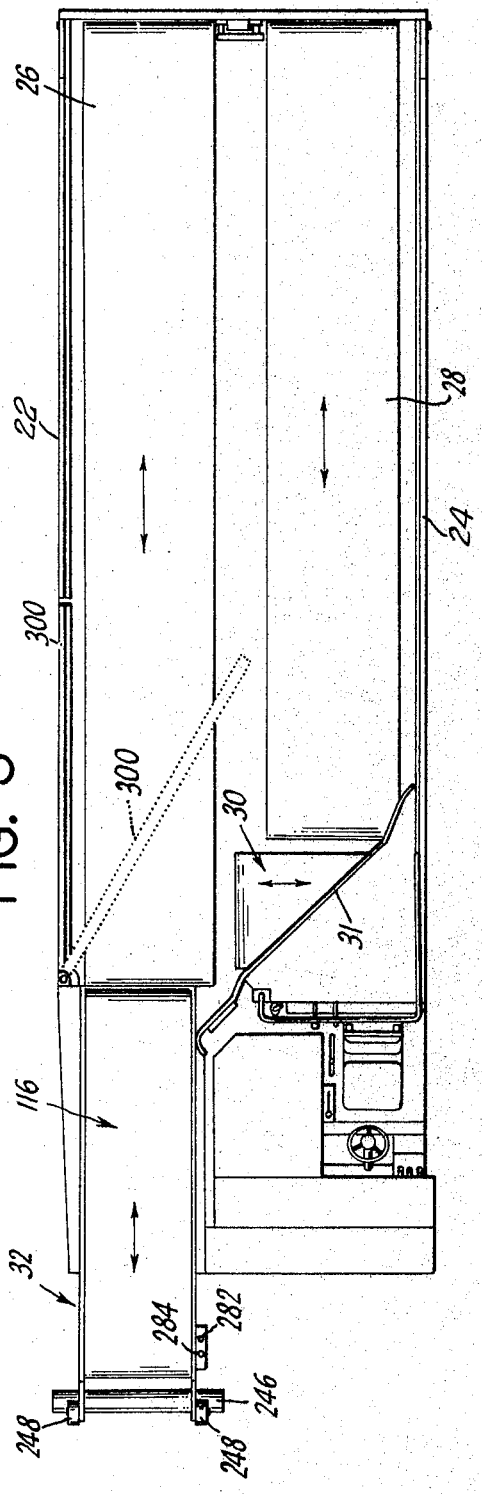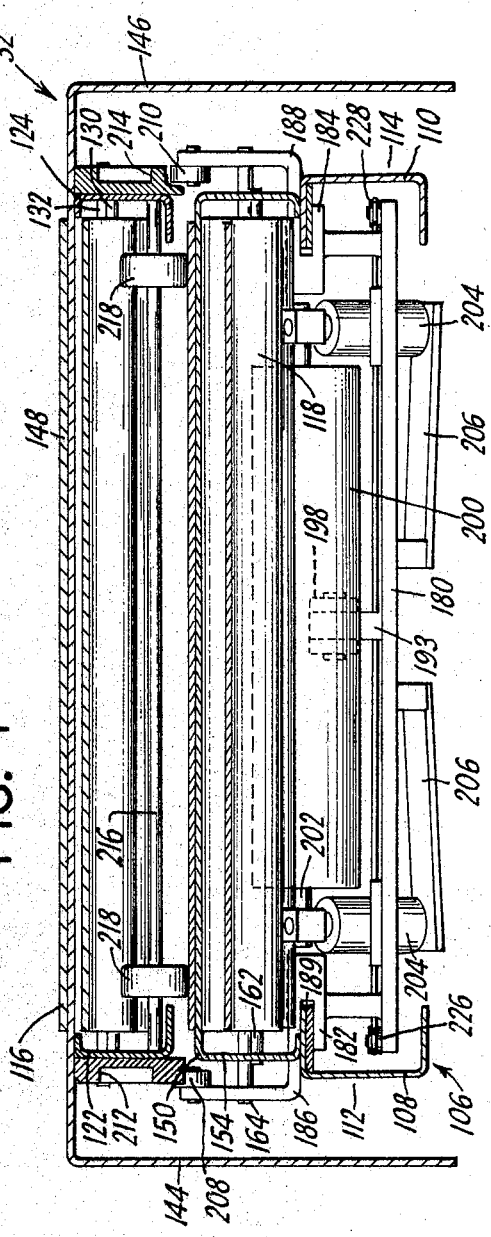

Aug. 18, 1970   M. L. MASTRACCI ET AL   3,524,558
CARGO LOADING MEANS AND METHOD
Filed March 29, 1968   6 Sheets-Sheet 3

INVENTORS
MICHAEL L. MASTRACCI
JOHN H. LANGENHOP

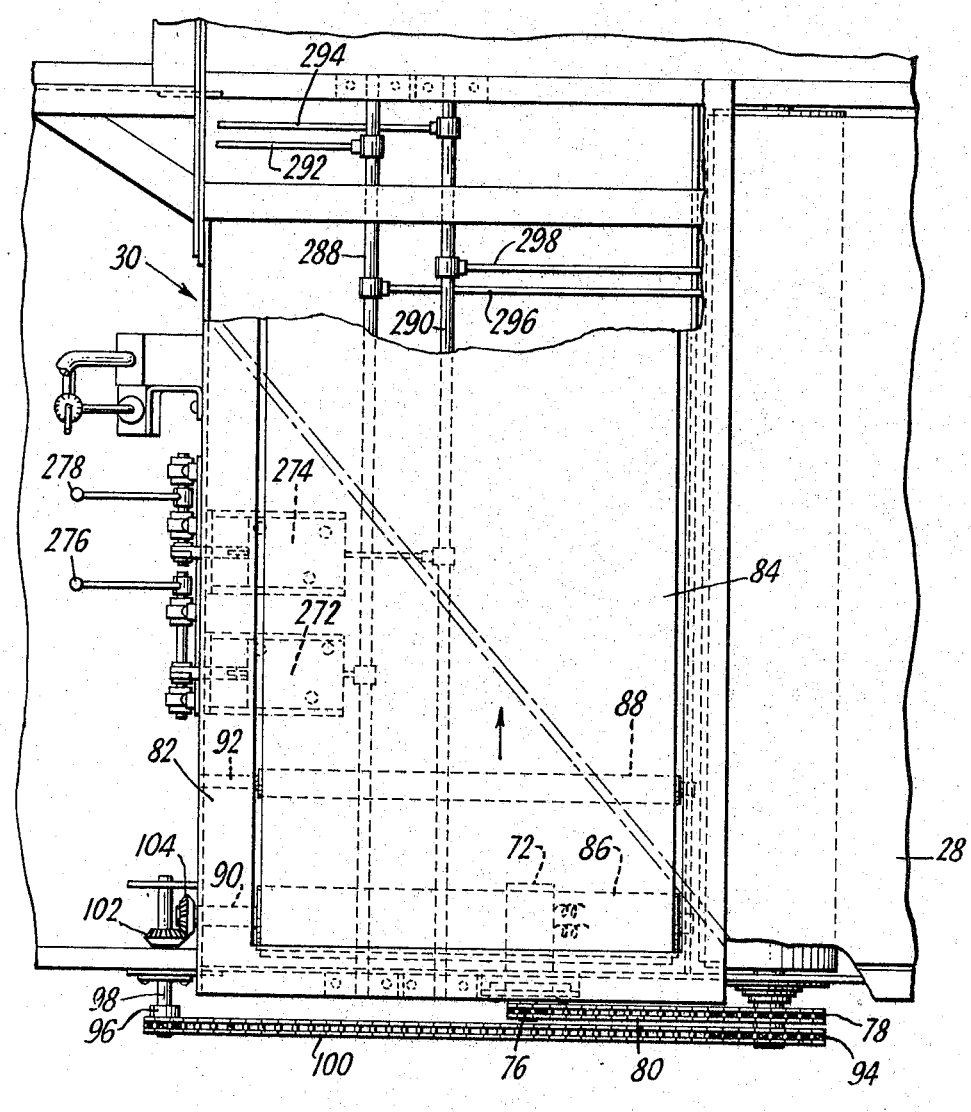

Aug. 18, 1970    M. L. MASTRACCI ET AL    3,524,558
CARGO LOADING MEANS AND METHOD
Filed March 29, 1968    6 Sheets-Sheet 5
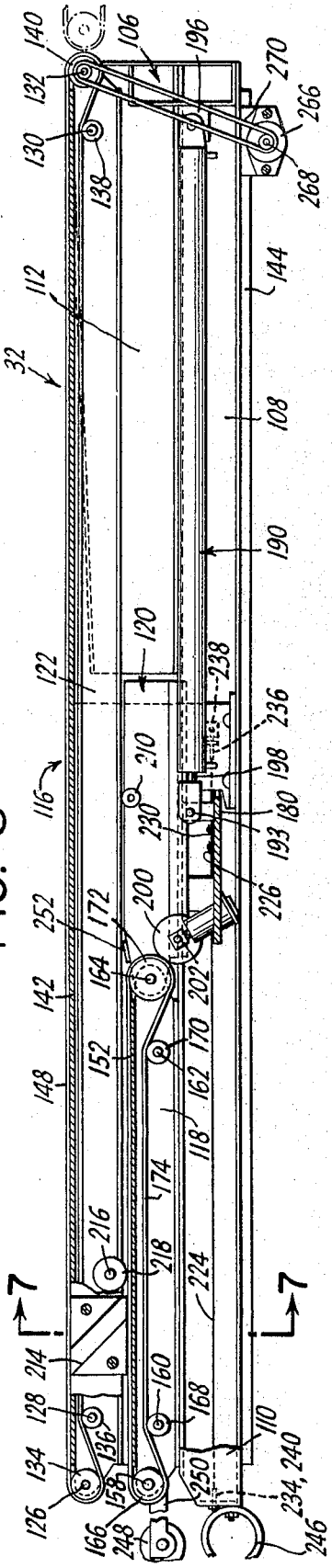
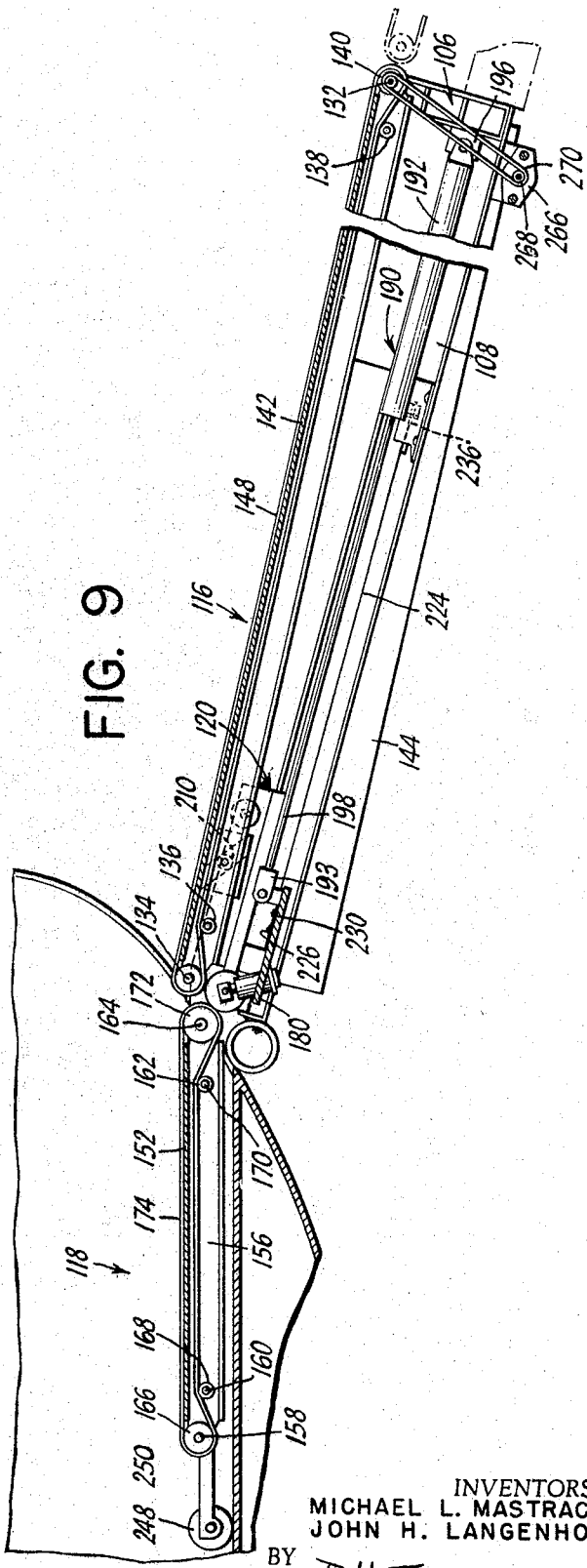
INVENTORS
MICHAEL L. MASTRACCI
JOHN H. LANGENHOP
BY
ATTORNEY Aug. 18, 1970   M. L. MASTRACCI ET AL   3,524,558
CARGO LOADING MEANS AND METHOD
Filed March 29, 1968   6 Sheets-Sheet 6

INVENTORS
MICHAEL L. MASTRACCI
JOHN H. LANGENHOP

United States Patent Office 3,524,558
Patented Aug. 18, 1970

1

3,524,558
CARGO LOADING MEANS AND METHOD
Michael L. Mastracci, and John H. Langenhop, York, Pa.,
assignors to American Machine & Foundry Company,
a corporation of New Jersey
Filed Mar. 29, 1968, Ser. No. 717,280
Claims priority, application Great Britain, Mar. 30, 1967,
14,484/67
Int. Cl. B65g 67/00, 41/00
U.S. Cl. 214—38                                    14 Claims

ABSTRACT OF THE DISCLOSURE

Apparatus for transporting articles between the interior of an aircraft and a ground facility, which comprises a vehicle having conveyor means thereon, means on the vehicle communicating with said conveyor means and operable to be extended within an aircraft and transport articles between said aircraft and said conveyor means, and means for operating said means extendible within said aircraft to cause a flow of articles between said aircraft and said conveyor means.

RELATION TO CO-PENDING APPLICATION

The vehicle disclosed in this application is utilizable as part of the freight transfer system disclosed in the assignee's co-pending application, Ser. No. 717,283, filed concurrently herewith.

BACKGROUND

This invention relates to materials handling and more particularly apparatus for rapidly and efficiently transporting articles between the interior of an aircraft or the like and ground facilities.

With the large and rapidly increasing market in air freight and air passengers, and the increased size and availability of airplanes, the state of the art in handling articles at air terminals has made rapid advancements. However, one area in which mechanization has not been fully exploited is that of rapidly transporting articles between aircraft and terminal facilities. These operations have remained largely manual in nature, the articles being loaded onto carts, driven out to the airplane and then lifted into the cargo hold of the plane. The same is true for the reverse operation.

SUMMARY

It is, accordingly, an object of this invention to provide apparatus for rapidly moving articles between aircraft and airport terminal facilities.

It is another object of this invention to provide apparatus for rapidly inserting articles in and withdrawing them from restricted areas.

It is another object of this invention to provide a vehicle having means for receiving articles from air terminal facilities and means for inserting said articles within an aircraft from a position adjacent thereto.

In accordance with these and other objects, the invention comprises means having a plurality of conveyor belts on the upper surface thereof and means in alignment with one of said conveyors that is extendible within an aircraft for transporting cargo from said conveyor belts into the aircraft and from the aircraft to the conveyors.

It is a still further object of this invention to provide a vehicle having means thereon for withdrawing articles from an aircraft to a position adjacent thereto, transporting them to an air terminal facility and delivering them thereto.

DESCRIPTION OF THE DRAWINGS

FIG. 1 is a side view of a vehicle according to a preferred embodiment of the invention.

FIG. 2 is a side view of the vehicle shown in FIG. 1 showing the relative orientation thereof with respect to an airplane when the vehicle is in its on-loading and off-loading position.

FIG. 3 is a plan view of the vehicle shown in FIGS. 1 and 2.

FIG. 6 is an enlarged detailed plan view of the drive arrangement for the left main conveyor belt and the cross-over conveyor belt along with an illustration of the controls for the conveyors.

FIG. 7 is a cross-sectional view of a preferred embodiment of an extendible conveyor belt assembly usable in association with the vehicle shown in FIGS. 1 through 3.

FIG. 8 is a view of the extendible conveyor belt assembly taken along line 5—5 of FIG. 4.

FIG. 9 is a side sectional view of the extendible belt assembly in its extended position within an aircraft.

DESCRIPTION OF THE PREFERRED EMBODIMENT

Figure 5:
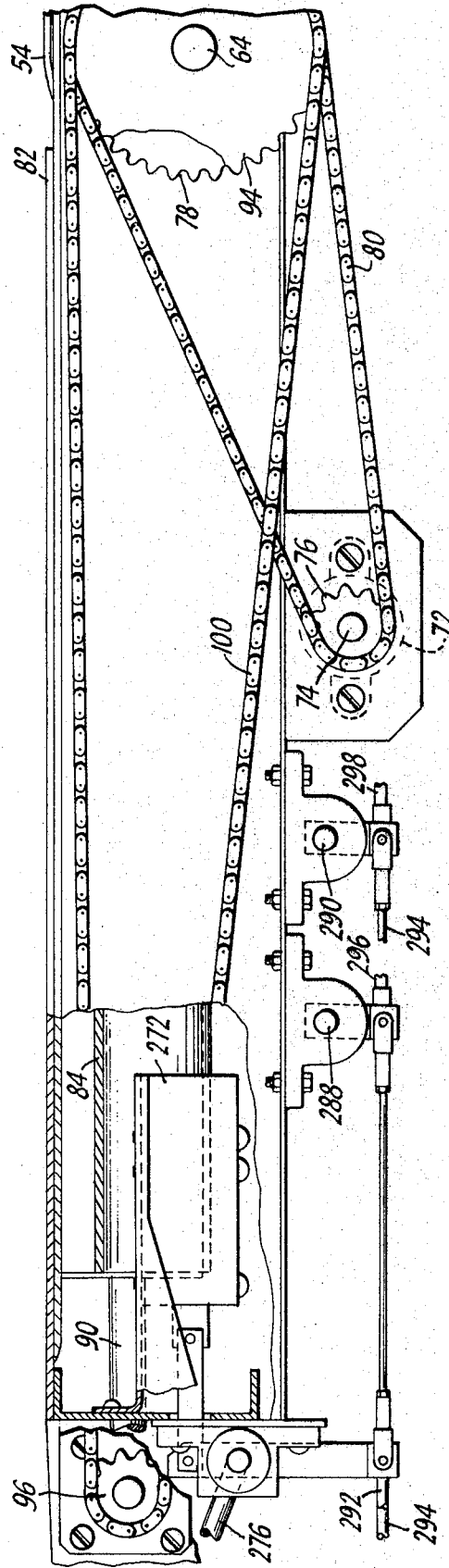
FIG. 5 is a side view, partially broken away, of a portion of the drive arrangement for the left main conveyor and the cross-over conveyor belt along with an illustration of the controls for the conveyors.

With reference to the drawings, apparatus according to the invention may comprise in a preferred embodiment a vehicle 10 having a chassis 12 and a body 14 mounted on top of the chassis and pivotally connected thereto at 16. A hydraulic lift device, generally designated 18, is provided to raise body 14 to the position shown in FIG. 2.

The vehicle is provided with conventional engine, drive and steering means such that it is readily driveable between aircraft in parking positions around the airport and terminal buildings at the airport.

The body 14 comprises an article receiving surface 20 and side walls 22 and 24. Left and right (as viewed from the front of the vehicle) longitudinally extending main conveyors, 26 and 28 respectively, are mounted on body 14 such that the upper passes thereof slide over the cargo receiving surface 20. A cross-over conveyor 30 is mounted in the forward portion of the vehicle for translating articles between main conveyors 26 and 28 in cooperation with a plow member and a wall 31 mounted on surface 20.

An extendible conveyor assembly 32 is mounted in body 14 in alignment with left main conveyor 26 (FIG. 3) and immediately adjacent thereto so that articles advanced by the left main conveyor will be moved onto conveyor assembly 32 and articles moved backwardly along assembly 32 will be delivered to conveyor 26. Conveyors 26, 28, and 30, and conveyor assembly 32 are driven by hydraulic motors powered by a fluid pump 33 that is driven by the vehicle's internal combustion engine. Control means are provided for causing the hydraulic motors to drive the conveyors 26, 28 and 30 in the forward and rearward directions at variable speeds, as will be described in detail hereinbelow.

Figure 4:
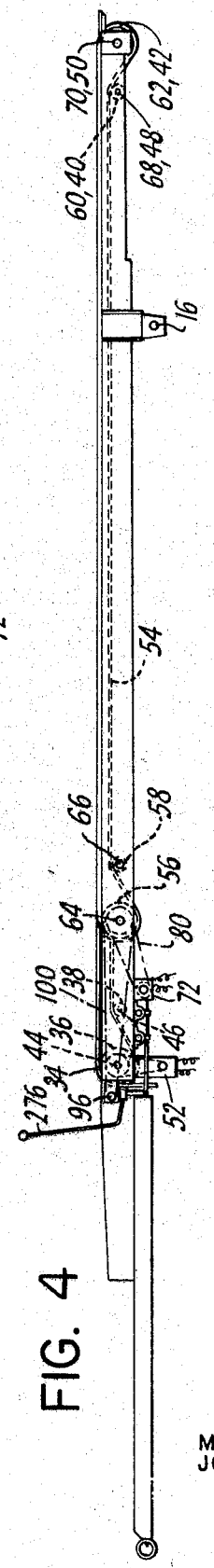
FIG. 4 is a side view of the main conveyor belt assemblies.

Referring now to FIG. 4, left main conveyor 26 comprises a belt 34 mounted about four rollers, designated 36, 38, 40 and 42 respectively, each of the rollers being mounted on a shaft, the shafts being designated 44, 46, 48 and 50 respectively. Shaft 44 is a driven shaft and the others are idler shafts. The driven shaft 44 is driven by a hydraulic motor 52 through a conventional sprocket and chain arrangement, with the rotation of shaft 44 imparting longitudinal movement to conveyor belt 26 through roller 36.

With reference now to FIGS. 5 and 6 as well as FIG. 4, right main conveyor 28 comprises a belt 54 mounted about four rollers, designated 56, 58, 60 and 62 respectively, each of the rollers being mounted on a shaft, the shafts being designated 64, 66, 68 and 70 respectively. Shaft 64 is a driven shaft and shafts 66, 68 and 70 are idler shafts.

A hydraulic motor 72 having a drive shaft 74 is provided for rotating shaft 64. A sprocket 76 is mounted on motor drive shaft 74 and a sprocket 78 is mounted on conveyor shaft 64, with rotation of the former being transmitted to the latter by a chain 80.

The cross-over conveyor 30 is mounted (FIG. 6) in a frame member 82 that forms part of the body of the vehicle and comprises a belt 84 that is mounted about four conveyor rollers mounted on respective shafts. Rollers 86 and 88, mounted on shafts 90 and 92 respectively, are shown in FIG. 5, it being understood that two similar rollers, similarly mounted on two shafts, support the other side of the conveyor.

Cross-over conveyor 30 is also driven from hydraulic motor 72. A second sprocket 94 (FIGS. 5 and 6) is mounted on conveyor shaft 64 in spaced relationship with a sprocket 96 mounted on a shaft 98 journalled in the body of the vehicle. A chain 100 transmits the rotation of conveyor shaft 64 to shaft 98 through the sprockets 94 and 96. Bevel gears 102 and 104, mounted on shafts 98 and 90 respectively, are provided to drive shaft 90 from shaft 98, thus driving conveyor 30.

Referring now to FIGS. 7–9, extendible conveyor assembly 32 is mounted in a housing 106 that includes a pair of opposed channel shaped lower frame members 108 and 110, and a pair of upper frame members 112 and 114, each connected to a respective lower frame member. The frame members 108, 110, 112 and 114 are affixed to body 14 by conventional bolting or welding means.

The assembly 32 generally comprises an upper conveyor 116, as extending conveyor 118 and a carriage 120 mounting the extending conveyor form ovement in housing 106.

Upper conveyor 116 includes a pair of side members, 122 and 124, and four shafts 126, 128, 130 and 132 respectively mounted therebetween. A conveyor roller is mounted on each of the shafts, being designated 134, 136, 138 and 140 respectively. A top plate 142 is mounted on side members 122 and 124 and includes depending protective flanges 144 and 146 that extend downwardly to the bottom of the assembly 32. A conveyor belt 148 is mounted over top plate 142 and the four rollers as shown in FIGS. 7 and 9.

The upper conveyor 116 is pivotally connected to housing 106 at the rear thereof as shaft 132 is pivotally mounted to upper frame members 108 and 110. The upper conveyor is also supported by the extending conveyor, when the latter is in its retracted position, as will be set forth hereinbelow.

The extending conveyor 118 comprises a frame 150 that includes a top plate 152 and a pair of opposed side channels 154 and 156 depending therefrom. The side channels, and thus the frame are supported for sliding movement on the top of the upper flanges of the lower frame members 108 and 110. Four shafts 158, 160, 162 and 164 are mounted between side channels 154 and 156. A conveyor roller is mounted on each of the shafts, the rollers being designated 166, 168, 170 and 172 respectively. A belt 174 is mounted over top plate and the rollers as shown in FIGS. 7 and 9.

Carriage 120 comprises a pair of opposed vertically extending members, 176 and 178, connected by a bottom plate 180. Each vertically extending member includes a mounting portion, 182 and 184 respectively, and a bracket portion, 186 and 188 respectively. Mounting portions 182 and 184 are provided with grooves 189 that are shaped to receive the upper flanges of lower frame members 108 and 110 in a slidable fit such that the carriage is slidable along the lower frame members. The extending conveyor 118 is connected to the carriage by means of roller shaft 164 being pivotally mounted between brackets 186 and 188.

Hydraulic means 190 are provided for moving carriage 120, and thus extending conveyor 118, back and forth along lower frame members 108 and 110. The hydraulic means includes a double acting cylinder 192 connected to housing 106 by a pair of brackets 194 and 196. A piston 198 is mounted for reciprocal movement in cylinder 192 and connected to carriage bottom plate 180 at 193. Thus, the carriage and the extending conveyor are movable with respect to housing 106 by actuation of the hydraulic cylinder 192.

A friction drive roller 200 is mounted on carriage 120 such that it engages extending conveyor belt 174 at roller 172. The friction drive roller is mounted on a shaft 202 that is rotatably mounted between a pair of members 204. Each of the members is mounted by a bracket 206 to the carriage bottom plate 180. The effect of this arrangement is to provide an independently suspended bias of friction drive roller 200 against conveyor belt 174 and roller 172.

The friction drive roller drives extending conveyor 118 from upper conveyor 116 when the extending conveyor is fully extended to the position shown in FIG. 6, whereat the upper conveyor 116 is pivoted downwardly about the axis of shaft 132 to a position where the upper conveyor belt 148 engages the friction drive roller 200 adjacent conveyor roller 134. This downwardly pivoted position of the upper conveyor is effected by means of a pair of cam rollers 208 and 210, mounted on the respective brackets 186 and 188 of carriage 120 and a pair of cam tracks, 212 and 214 each mounted in spaced relationship with a cam roller on upper conveyor side channels 154 and 156.

A support shaft 216 for maintaining upper conveyor 116 parallel to extending conveyor 118 when the latter is in its retracted position is mounted on a pair of rollers 218 that are supported by the upper pass of extending conveyor belt 174, the shaft also being mounted in upper conveyor side members 122 and 124. Thus, as long as the extending conveyor supports rollers 218, the upper conveyor will be supported parallel thereto. When this support is removed, the upper conveyor is free to pivot downwardly about the axis of shaft 132.

As extending conveyor 118 extends, the cam rollers enter the cam tracks and pull the upper conveyor downwardly. Since the support for rollers 218 has already been removed by the extension of the extending conveyor, the upper conveyor is drawn downwardly to the position shown in FIG. 9.

Figure 10:
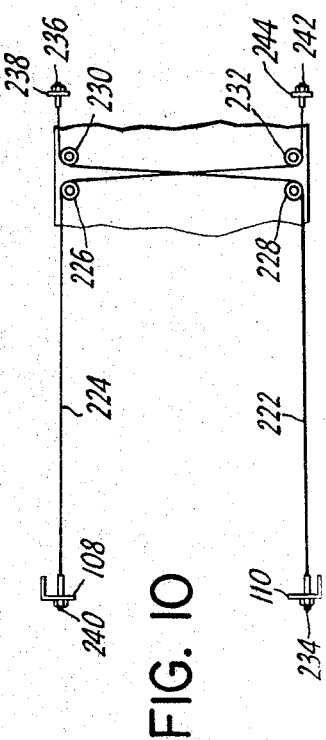
FIG. 10 is a plan view of a wire and pulley assembly for the extendible belt assembly.

A cable and pulley assembly 220 is provided to keep the extending conveyor parallel to the side frame members as it extends and retracts. This arrangement is similar to that used in a draftsmen's slidable straight edge to maintain the lines drawn thereby parallel at all positions. With reference to FIG. 10, the assembly 220 includes two cables, 222 and 224 and four pulleys designated 226, 228, 230 and 232. One end of cable 222 is anchored to the front of lower frame member 110 by a member 234 and the other end is anchored to the middle of lower frame member 108 by a member 236 mounted on a bracket 238. The cable slides on and is traversed across the bottom of assembly 32 between the frame members by being passed about pulleys 228 and 230 as shown in FIG. 10. In a like manner, cable 224 is anchored between a mounting member 240 at the front of lower frame member 108 and a mounting member 242 connected to a bracket 244 mounted in the middle of lower side frame member 110. The cable is traversed across the bottom of the assembly by being passed about pulleys 226 and 232. The four pulleys are mounted on carriage 120 and as the carriage extends and retracts the cables will hold the path of travel of the extending conveyor parallel to the longitudinally extending portions of the cables 222 and 224.

A rubber bumper 246 is mounted to the leading edge of the extendible conveyor assembly 32 by bolting it to lower frame members 108 and 110. The purpose of the bumper is to facilitate the positioning of the vehicle with respect to an aircraft prior to extending the extending conveyor 118. This is done by manipulating the vehicle steering and drive apparatus and hydraulic lift means 18 until bumper 246 abuts the aircraft just below the sill of the aircraft door.

When this position is achieved and the extending belt 118 extended all the way out to the position illustrated in FIG. 9, the extending conveyor will pivot downwardly until a pair of wheels 248, mounted to the leading edge thereof by struts 250, touch the floor of the interior of the aircraft. This downward pivoting capability is caused by the fact that the extending conveyor is only connected to the assembly housing 106 by the pivotal connection of roller shaft 164 to carriage 120 and the support provided by lower frame members 108 and 110 is removed when the conveyor is extended therepast. The amount of downward pivot of the extended extending conveyor 118 is limited by a stop block 252 mounted on carriage 120.

Figure 11:
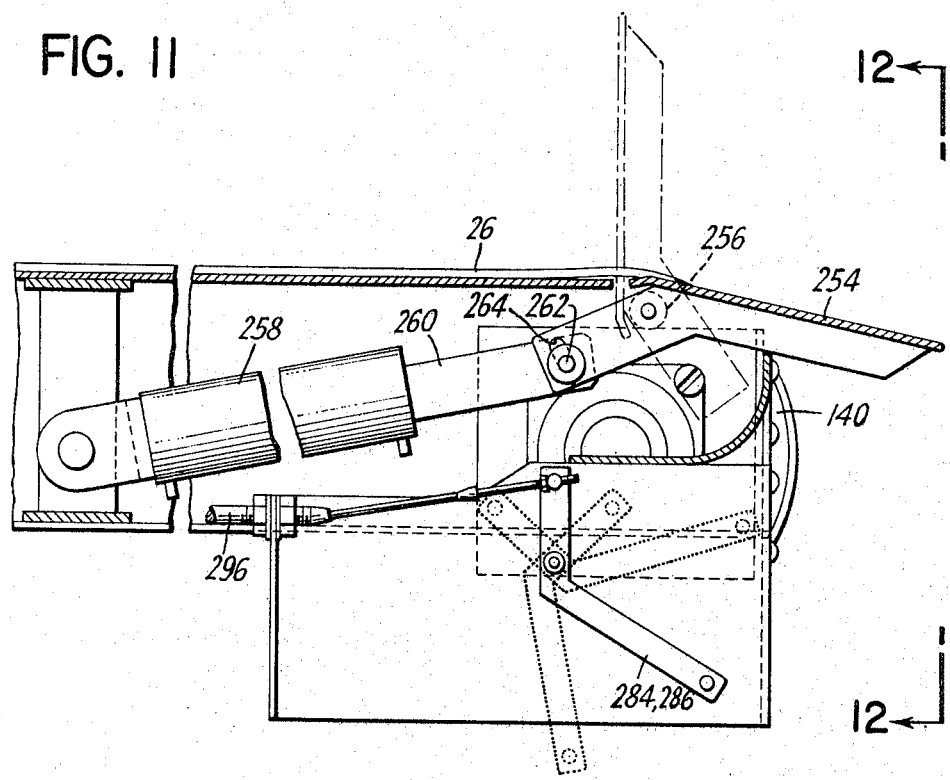
FIG. 11 is a side sectional view of the rear of the vehicle showing the tailgate assembly and the conveyor controls.
Figure 12:
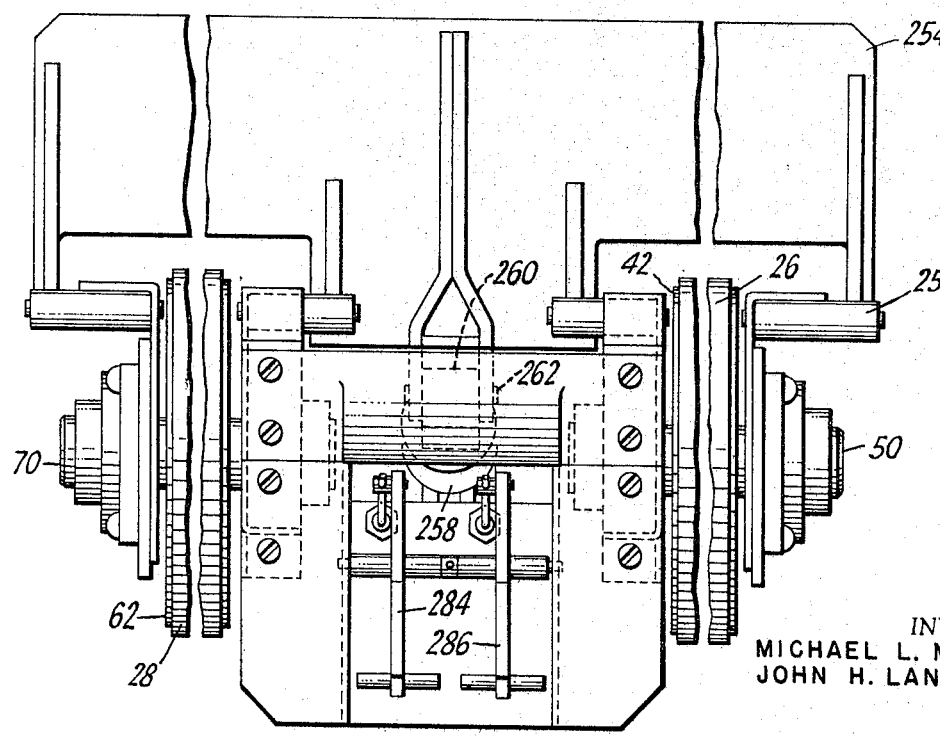
FIG. 12 is a view taken from the rear of the vehicle showing further details of the structure shown in FIG. 11.

With reference to FIGS. 11 and 12, a tailgate 254 is provided at the rear of the vehicle. The tailgate is pivotal about a shaft 256 between a vertical position, shown in phantom in FIG. 11, whereat it is operable to act as a back stop for cargo on conveyor belts 26 and 28, and a substantially horizontal position shown in solid lines, whereat it is operable to form a bridge between the conveyors 26 and 28 and a delivery area to the rear of the vehicle for off-loading. Pivotal movement of the tail gate between the vertical and horizontal positions shown in FIG. 11 is provided by a hydraulic cylinder 258 having a piston member 260. The piston member is attached by a pin 262 to a slot 264 in the rear of the tailgate. Slot 264 allows the tailgate "float" in a vertical direction when it is in its horizontal position as cargo is loaded and unloaded from the vehicle.

Referring now back to FIG. 8, a hydraulic motor 266 having a driven shaft 268 is mounted to lower side frame member 110 to drive upper conveyor 116 through sprockets mounted on shafts 268 and 132 and a chain 270 mounted therebetween.

The speed and direction of movement of conveyor 26, conveyors 28 and 30, and conveyor 116 are controllable by a pair of valves, 272 and 274 respectively (FIG. 6) connected between fluid pump 33 and hydraulic motors 52, 72 and 266 respectively.

Valves 272 and 274 are controllable by three sets of levers. One set of levers, 276 and 278, is shown, that located adjacent to the cab portion of the vehicle. The direction and speed of conveyors 28 and 30 are controllable by the direction and amplitude of motion of lever 276 and the direction and speed of conveyors 26 and 116 are controlled in a like manner by lever 278.

For convenience, a second set of levers, 380 and 282, is mounted adjacent the front of the vehicle (FIG. 2) and a third set of levers, 284 and 286, is mounted at the rear of the vehicle (FIGS. 11 and 12) so that the direction and speed of the conveyors may be controlled either by personnel positioned opposite the front of the vehicle, for example within an aircraft into which the extending conveyor has been extended; or by personnel positioned opposite the rear of the vehicle, for example, within a terminal building like that disclosed in the assignees' co-pending application, Ser. No. 717,283.

The motion of the levers at the front and rear of the vehicle are transmitted to valves 272 and 274 by a pair of shafts 288 and 290, connected to valves 272 and 274 respectively, and a first pair of 292 cables, and 294, connected between shaft 288 and levers 280 and 284 respectively, and a second pair of cables 296 and 298, connected between shaft 290 and levers 282 and 286 respectively.

The operation, when it is desired to off load an aircraft, the vehicle 10 is driven to a position adjacent thereto and hydraulic lifting means 18 is activated to lift body 14 to a position where the leading edge of extendible conveyor assembly 32 is adjacent the aircraft cargo hold door. Precise positioning is achieved by placing bumper 246 in a position just below the sill of the aircraft door. Hydraulic means 190 is then actuated to extend extending conveyor 118 into the interior of the plane, the extending conveyor pivoting downwardly until wheels 248 engage the floor of the aircraft.

Hydraulic motors 52, 72 and 266 are then activated to drive the conveyors 26, 28 and 30, and 116 respectively in their rearward directions, with conveyor 116 driving extending conveyor 118 through friction roller 200. In this mode of operation, articles within the plane are simply lifted onto the leading edge of the extending conveyor 118, also within the plane, with the latter carrying them back over upper conveyor 116 to main conveyor 26, and when gate 300 is moved to the position shown in phantom in FIG. 3, over conveyor 30 to conveyor 28.

If it is desired to closely pack the articles on conveyors 26, conveyor 26 is slowed by actuation of a valve 302 which is connected between valve 274 and hydraulic motor 52, thus bunching the articles on conveyor 26. Valve 302 can only be actuated when the conveyors are driven towards the rear of the vehicle. Tailgate 254 is in its vertical position driving the aircraft off loading operation to form a backstop for the articles being advanced to the rear of the vehicle by the conveyors 26 and 28.

An alternate method of conveyor operation while off loading an aircraft is to drive conveyor 26 backwardly and drive conveyor 28 forwardly at a slower speed and manually transfer articles from conveyor 26 to conveyor 28 in the vicinity of the tailgate 254.

When either the vehicle is fully loaded with articles or the cargo hold of the aircraft is empty, the extending conveyor 118 is retracted into housing 106 and the hydraulic means 18 is actuated to pivot body 14 downwardly to its horizontal position. The vehicle is then driven to a discharge area. In the case of the system disclosed in the assignees' co-pending application, Ser. No. 717,283, the discharge area is the entry conveyor lanes of a cargo transfer system building. At the discharge position, the tailgate 254 is lowered to its substantially horizontal position and motors 266, 52 and 72 are activated to drive 116, and 28 to the rear of the vehicle, delivering the articles supported thereon across the tailgate to the delivery area.

When it is desired to utilize the vehicle to load an aircraft with articles the opposite procedure is followed. The motors are actuated to drive the conveyors toward the front of the vehicle articles are loaded onto conveyors 26 and 28 from the rear of the vehicle across tailgate 254, the tailgate is raised when the vehicle loading operation is completed, the loaded vehicle is driven out to a position adjacent the aircraft, hydraulic means 18 lifts body 14 to position bumper 246 beneath the sill of the aircraft door, the extending conveyor 118 is extended into the aircraft by hydraulic means 190 and the conveyor motor are started to move the articles on the main conveyors onto the conveyors 118 and 116 and into the aircraft.

We claim:

1. A method of transporting articles between the interior of an aircraft and a ground facility, comprising the steps of:
   locating a vehicle having an extendible conveyor belt assembly adjacent the aircraft,
   pivoting a portion of the vehicle so that the extendible belt assembly is positioned adjacent to and in spaced relationship with a door in the aircraft,
   extending a portion of said extendible belt assembly through the aircraft door into the interior of the aircraft, and
   driving said portion of the extendible belt assembly to form an article conveyance between the vehicle and the aircraft.

2. Apparatus for transporting articles between the interior of an aircraft and a ground facility, which comprises:
   a vehicle having first conveyor means thereon,
   means for pivoting said first conveyor means to a position whereat one end thereof is adjacent an aircraft door,
   second conveyor means communicating with said one end of said first conveyor means,
   means for extending said second conveyor means substantially within an aircraft, and
   means for operating said second conveyor means within said aircraft to cause a flow of articles between the interior of said aircraft and said first conveyor means.

3. Apparatus according to claim 2, wherein:
   said second conveyor means comprises a conveyor belt assembly driveable in forward and reverse directions.

4. Apparatus for transporting articles between the interior of an aircraft and a ground facility, which comprises:
   a vehicle having conveyor means thereon,
   an extendible conveyor assembly mounted on the vehicle, said extendible conveyor assembly communicating with said conveyor means and being operable to be extended substantially within an aircraft to transport articles between the interior of said aircraft and said conveyor means,
   said extendible conveyor assembly including a housing, a first conveyor mounted in said housing in alignment with said conveyor means and a second conveyor mounted for movement in said housing between a retracted position beneath said first conveyor and a second position whereat it is in alignment with said first conveyor and operable to form a continuous conveyor path therewith, and
   means for driving said first and second conveyors to cause a flow of articles between said aircraft and said conveyor means.

5. Apparatus for transporting articles between the interior of an aircraft and a ground facility, which comprises:
   a vehicle,
   conveyor means mounted on said vehicle, said conveyor means including a plurality of main conveyors, cross over conveyor means for translating cargo between the main conveyors, and means for driving the conveyors in forward and reverse directions,
   means on the vehicle communicating with said conveyor means and operable to be extended substantially within an aircraft to transport articles between the interior of said aircraft and said conveyor means, and
   means for operating said means extendible within said aircraft to cause a flow of articles between said aircraft and said conveyor means.

6. Apparatus according to claim 4, wherein said conveyor means includes a plurality of main conveyors, cross over conveyor means for translating cargo between the main conveyors, and means for driving the conveyors in forward and reverse directions.

7. Apparatus according to claim 6, wherein one of said main conveyors is in alignment with said first conveyor of the extendible conveyor assembly.

8. Apparatus according to claim 7, wherein means are provided for slowing the speed of the main conveyors with respect to the speed of the extendible conveyor assembly when the conveyors are driven in the reverse direction to close the spacing between articles loaded on the extendible conveyor assembly.

9. Apparatus for transporting articles, which comprises:
   a vehicle having a platform thereon,
   conveyor means mounted on said platform,
   means for pivoting said platform about a horizontal axis to position said platform at a selected angular position,
   extendible conveyor means mounted on said platform and communicating with said conveyor means,
   means for extending said extendible conveyor means independently of said platform pivoting means, and
   means pivotally mounting a portion of said extendible conveyor means such that the extended portion thereof, when fully extended, may pivot away from said selected angular position.

10. Apparatus according to claim 9, wherein said vehicle is operable to transport articles through open doorways and said extendible conveyor means is operable to extend a driven conveyor belt through a doorway after said platform pivoting means has positioned it adjacent to and in spaced relationship with the doorway.

11. Apparatus according to claim 4, further comprising a roller mounted to frictionally engage said first conveyor and said second conveyor when the latter is in its extended position to drive the latter from the first conveyor.

12. Apparatus for transporting articles, which comprises:
   a vehicle having a platform thereon,
   conveyor means mounted on said platform,
   means for pivoting said platform about a horizontal axis to position said platform at a selected angular position,
   an extendible conveyor assembly mounted on said platform and communicating with said conveyor means,
   said extendible conveyor assembly including a housing, a first conveyor mounted in said housing in alignment with said conveyor means and a second conveyor mounted for movement in said housing between a retracted position beneath said first conveyor and a second position whereat it is in alignment with said first conveyor and operable to form a continuous conveyor path therewith, and
   means for extending second conveyor independently of said platform pivoting means.

13. Apparatus according to claim 12, further comprising a roller mounted to frictionally engage said first conveyor and said second conveyor when the latter is in its extended position to drive the latter from the first conveyor.

14. Apparatus for transporting articles, which comprises:

a vehicle having a platform thereon,
conveyor means mounted on said platform, said conveyor means including a plurality of main conveyors, cross over conveyor means for translating cargo between the main conveyors, and means for driving the conveyors in forward and reverse directions,
means for pivoting said platform about a horizontal axis to position said platform at a selected angular position,
extendible conveyor means mounted on said platform and communicating with said conveyor means, and
means for extending said extendible conveyor means independently of said platform pivoting means.

References Cited

UNITED STATES PATENTS

| 3,066,817 | 12/1962 | Bradshaw et al. | 198—139 XR |
|---|---|---|---|
| 3,184,045 | 5/1965 | Fry | 198—233 |
| 3,356,236 | 12/1967 | Shaw et al. | 214—38 |

ROBERT G. SHERIDAN, Primary Examiner

U.S. Cl. X.R.

198—76, 89, 233; 214—152; 244—137